United States Patent Office 2,894,948
Patented July 14, 1959

2,894,948

3,7-DISULFAMYL-BENZOTHIADIAZINE 1,1-DIOXIDES

George De Stevens, New Providence, and Lincoln Harvey Werner, Summit, N.J., assignors to Ciba Pharmaceutical Products, Inc., Summit, N.J., a corporation of New Jersey No Drawing. Application December 20, 1957
Serial No. 703,998

7 Claims. (Cl. 260—243)

The present invention relates to 1,2,4-benzothiadiazines. More particularly it concerns 6-R-3,7-disulfamyl-1,2,4-benzothiadiazine-1,1-dioxides, in which R stands for a member of the group consisting of halogen and halogeno-methyl, as well as process for the preparation of such compounds. A halogen atom is more especially a fluorine or a bromine, particularly a chlorine atom; a halogeno-methyl group is represented by a chloromethyl or primarily a trifluoromethyl group.

Due to tautomerism the double bond of the 1,2,4-benzothiadiazine-1,1-dioxides nucleus may be accommodated in the 2,3- or in the 3,4-position; the compounds of the present invention may exist in two forms of the formulae:

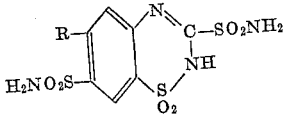

and

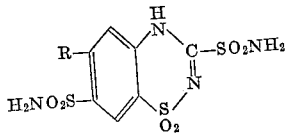

in which R has the above given meaning.

The new 1,2,4-benzothiadiazine derivatives of this invention have diuretic properties and may be used as diuretic agents, for example, in conditions causing excessive salt- and water-retention, e.g. heart insufficiency, hypertension, liver damages or kidney diseases. The new compounds may be used as medicaments in the form of pharmaceutical preparations, which contain the new compounds in admixture with a pharmaceutical organic or inorganic, solid or liquid carrier suitable for enteral or parenteral administration. For making up the preparations there can be employed substances which do not react with the new compounds, such as water, gelatine, lactose, starches, magnesium stearate, talc, vegetable oils, benzyl alcohols, gums, polyalkylene glycols, petroleum jelly or any other known carrier for medicaments. The pharmaceutical preparations may be in solid form, for example, as tablets or dragees, or in liquid form, for example, as solutions, e.g. isotonic solutions or emulsions. If desired, they may contain auxiliary substances, such as preserving agents, stabilizing agents, wetting or emulsifying agents, salts for varying the osmotic pressure or buffers. They may also contain, in combination, other therapeutically useful substances, for example, hypotensive agents, e.g. rauwolfia alkaloids, such as reserpine, rescinnamine or deserpidine.

The new 1,2,4-benzothiadiazine-1,1-dioxides of this invention may be prepared according to several methods. A particularly suitable procedure comprises treating a solution of a 3-mercapto-6-R-7-sulfamyl-1,2,4,-benzothiadiazine-1,1-dioxide, in which R has the above given meaning, with a mixture of chlorine and oxygen, converting in the resulting product the sulfonyl chloride group into a sulfamyl group by treatment with ammonia and isolating the desired 6-R-3,7-disulfamyl-1,2,4-benzothiadiazine-1,1-dioxide.

The oxidation of the mercapto group of a 3-mercapto-6-R-7-sulfamyl-1,2,4-benzothiadiazine-1,1-dioxide may be carried out by treatment of the starting material with chlorine in the presence of oxygen, e.g. air with the simultaneous formation of a sulfonyl chloride group. This oxidation may be performed by bubbling a mixture of chlorine and air through a solution of the starting material, for example, in lower alkanoic acid, e.g. acetic acid. The resulting sulfonyl chloride derivative is preferably used without further purification.

The sulfonyl chloride group in the resulting 6-R-7-sulfamyl - 1,2,4 - benzothiadiazine-1,1-dioxide-3-sulfonyl chloride is replaced by the sulfamyl group by treatment with ammonia, for example, liquid ammonia or aqueous ammonia. The desired 6-R-3,7-disulfamyl-1,2,4-benzothiadiazine-1,1-dioxide may be isolated by removing the ammonia, and is purified by recrystallization, for example, from a hydroxylated solvent, such as an alcohol, e.g. ethanol.

The 3-mercapto-6-R-7-sulfamyl-1,2,4-benzothiadiazine-1,1-dioxides used as the starting materials, which are new and are intended to be included within the scope of this application, may be prepared, for example, by replacing the oxo group in a 6-R-7-sulfamyl-1,2,4-benzothiodiazine-3-one-1,1-dioxide, by a thiono group, which, by shifting of the tautomeric double bond, may be transformed into a mercapto group. Such a replacement may be carried out, by treating a 6-R-7-sulfamyl-1,2,4-benzothiadiazine-3-one-1,1-dioxide with phosphorus trisulfide or preferably with phosphorus pentasulfide, if desired, in the presence of a solvent, such as a hydrocarbon, e.g. benzene or toluene, at an elevated temperature, for example, the boiling temperature of the solvent. The 6-R-7-sulfamyl-1,2,4-benzothiadiazine-3-one-1,1-dioxide may be obtained by reacting a 5-R-2,4-disulfamyl-aniline with phosgene, preferably in a hydrocarbon, e.g. benzene or toluene, solution. Furthermore, the 3-mercapto-6-R-7-sulfamyl-1,2,4-benzothiadiazine-1,1-dioxide used as a starting material may be prepared by treating a 5-R-2,4-disulfamyl-aniline, in which R has the above given meaning, with thiophosgene to effect the ring closure to the 3-mercapto-thiophosgene 1,2,4-thiadiazine-1,1-dioxide ring. The thiophosgene is preferably added in a solution, for example, in a hydrocarbon, e.g. benzene or toluene, solution, to a solution of the aniline derivative in a similar solvent, e.g. benzene or toluene.

The invention also comprises any modification of the general process wherein a compound obtainable as an intermediate at any stage of the process is used as the starting material and the remaining step(s) of the process is (are) carried out, as well as any new intermediates. The following examples illustrate the invention; they are not to be construed as being limitations thereon. Temperatures are given in degrees centigrade.

Example 1

A solution of 32.8 g. (0.1 mole) of 3-mercapto-6-chloro-7-sulfamyl-1,2,4-benzothiadiazine-1,1-dioxide in 300 ml. of dilute acetic acid is treated with an excess of an air-chlorine mixture by bubbling the gas through the stirred solution. The formed precipitate is collected without purification and added to liquid ammonia. After stirring for 2 hours the ammonia is allowed to evaporate and the residue is taken up in warm ethanol, from which the 6-chloro-3,7-disulfamyl-1,2,4-benzothiadiazine-1,1-dioxide precipitates upon cooling.

The 3-mercapto - 6 - chlor-7-sulfamyl-1,2,4-benzothiadiazine-1,1-dioxide used as the starting material may be prepared as follows: To a solution of 85.6 g. (0.3 mole) of 5-chloro-2,4-disulfamyl-aniline in 500 ml. of toluene is added a solution of 35 g. of thiophosgene in 100 ml. of toluene while stirring. The mixture is filtered, the filtrate evaporated to dryness under reduced pressure and the residue recrystallized from ethanol or a mixture of ethanol and water to yield the desired 3-mercapto-6-chloro-7-sulfamyl-1,2,4-benzothiadiazine-1,1-dioxide.

*Example 2*

Through a solution of 18.05 g. (0.05 mole) of 3-mercapto - 6 - trifluoromethyl-7-sulfamyl-1,2,4-benzothiadiazine-1,1-dioxide in 100 ml. of dilute acetic acid is bubbled a mixture of air and chlorine, the latter in excess of the starting material, and the resulting precipitate is filtered off. It is immediately added to a concentrated aqueous ammonia solution, which is heated and stirred for 3 hours and then concentrated under reduced pressure. The residue is dissolved in warm ethanol and the 6-trifluoromethyl - 3,7-disulfamyl-1,2,4-benzothiadiazine-1,1-dioxide crystallizes upon cooling.

The starting material used in the above reaction may be prepared as follows: To a solution of 63.8 g. of 5-trifluoromethyl-2,4-disulfamyl-aniline in 500 ml. of toluene is added a solution of 20 g. of phosgene in 100 ml. of toluene while cooling and stirring. The solvent is stripped off, the residue, after recrystallization from ethanol, is taken up in 500 ml. of benzene and refluxed with 45 g. of phosphorus pentasulfide. The reaction mixture is filtered, water added and the benzene solution separated. The water layer is extracted with benzene, the two benzene extracts combined, dried and the solvent evaporated. The resulting 3-mercapto-6-trifluoromethyl-7-sulfamyl-1,2,4-benzothiadiazine-1,1-dioxide is used without further purification.

What is claimed is:

1. 6 - R-3,7 - disulfamyl - 1,2,4-benzothiadiazine-1,1-dioxides, in which R stands for a member of the group consisting of halogen and halogeno-methyl.

2. 6-chloro-3,7-disulfamyl-1,2,4-benzothiadiazine-1,1-dioxide.

3. 6-trifluoromethyl-3,7-disulfamyl-1,2,4-benzothiadiazine-1,1-dioxide.

4. 3-mercapto-6-R-7-sulfamyl-1,2,4-benzothiadiazine-1,1-dioxide, in which R stands for a member of the group consisting of halogen and halogeno-methyl.

5. 3-mercapto-6-chloro-7-sulfamyl-1,2,4-benzothiadiazine-1,1-dioxide.

6. 3-mercapto-6-trifluoromethyl-7-sulfamyl-1,2,4-benzothiadiazine-1,1-dioxide.

7. Process for the preparation of 3-mercapto-6-R-7-sulfamyl-1,2,4-benzothiadiazine-1,1-dioxide, in which R stands for a member of the group consisting of halogen and halogeno-methyl which comprises treating a 5-R-2,4-disulfamyl-aniline, in which R has the above given meaning, with thiophosgene.

References Cited in the file of this patent

UNITED STATES PATENTS 2,809,194    Novello  ---------------- Oct. 8, 1957

OTHER REFERENCES

Craig et al.: J. Org. Chem., vol. 22, p. 7, June 1957.
Synthetic Org. Chem. (Wagner), N.Y., John Wiley (1953), pp. 821–822.